United States Patent [19]

Yamada et al.

[11] 4,206,183

[45] Jun. 3, 1980

[54] METHOD OF REMOVING MERCURY-CONTAINING CONTAMINATIONS IN GASES

[75] Inventors: Minoru Yamada, Akita; Abe, Hideki, Yachiyo; Kiyomi Yamaguchi, Kosaka, all of Japan

[73] Assignee: Dowa Mining Co., Ltd., Japan

[21] Appl. No.: 31,008

[22] Filed: Apr. 18, 1979

Related U.S. Application Data

[63] Continuation of Ser. No. 749,056, Dec. 9, 1976, abandoned.

[51] Int. Cl.$^2$ ............................................. B01D 53/34
[52] U.S. Cl. ................................... 423/210; 423/244; 423/544; 423/559; 423/561 B
[58] Field of Search ..................... 423/210, 544, 561 B, 423/210 M, 244 R, 559; 55/72

[56] References Cited

U.S. PATENT DOCUMENTS

| | | | |
|---|---|---|---|
| 3,661,509 | 5/1972 | Ferrara et al. | 423/210 M |
| 3,786,619 | 1/1974 | Melkersson et al. | 423/210 M |
| 3,956,458 | 5/1976 | Anderson | 423/210 M |

FOREIGN PATENT DOCUMENTS

| | | | |
|---|---|---|---|
| 1075953 | 2/1960 | Fed. Rep. of Germany | 423/210 M |
| 1477 | 1/1975 | Japan | 423/210 M |
| 11076 | 1/1976 | Japan | 55/72 |
| 868063 | 5/1961 | United Kingdom . | |

OTHER PUBLICATIONS

Hawley, "The Condensed Chemical Dictionary", 8th Ed., Van Nostrand Reinhold Company, New York, 1974, p. 216.

*Primary Examiner*—Earl C. Thomas
*Attorney, Agent, or Firm*—Stevens, Davis, Miller & Mosher

[57] ABSTRACT

The present invention relates to a method of removing mercury-containing contaminations in gases by passing the gas to be purified through a filter bed which is devised to make the gas contact effectively. The method is characterized in that, the filter bed is consisted of specific material prepared by binding onto a carrier substance such as granulated pumice, with sulfurous substance as contamination absorbing agent, such as natural sulfide minerals subjected to a surface activation pretreatment, synthetized metal sulfides and sulfur.

According to the present invention, it is intended to remove contaminations in gases, especially those containing vaporized mercury together with adsorption on the filter bed material, in such a mechanism that mercury, which has a high vapor pressure, is converted into its sulfide, which shows very low vapor pressure, by contacting the gas with sulfides of other metals or with sulfur.

The present invention relates to a method of removal of metals and their compounds, especially of mercury and its compounds, contained in gases.

5 Claims, No Drawings

4,206,183

METHOD OF REMOVING MERCURY-CONTAINING CONTAMINATIONS IN GASES

This is a continuation of application Ser. No. 749,056, filed Dec. 9, 1976, and now abandoned.

BACKGROUND OF THE INVENTION

In refinery of non-ferrous metals, mercury contained in the raw sulfide ore or in the slag in small amount will be turned out in a form of compound or metal vapour by thermal treatment procedures, such as heating, roasting and so on, and will be included in gases.

Since the vapour pressure of mercury is relatively high, it is often contained in the exhaust gas in gaseous or finely dispersed state, and therefore, if these gases are exhausted without treatment, the atmosphere will be polluted when such gases are used for the production of sulfuric acid, the thereby obtained sulfuric acid will be contaminated with mercury due to absorption.

In general, for removing metals or its compounds in gases, there have been many procedures, which may be employed separately or in combination, for example, using scrubber or bag filter, cyclone separation, gravity setting and Cottrell precipitation. While it will be possible to remove, for example, mercury compounds in finely dispersed state by these procedures, they cannot attain a complete removal of gaseous substance, such as mercury vapour, since all these procedures are based on a physical dust removal principle.

On the other hand, in order to remove small amount of mercury in chemical way, there are several methods proposed. For example, a solution having oxidizing property, such as a solution containing sulfuric acid, is used for scrubber liquid, and a chemical reaction with iodide ion etc. is utilized. In these methods, however, the effectiveness of mercury removal by oxidation will vanish by reduction by sulfurous acid gas for example, so that they cannot be assumed as excellent for removing mercury in gases from the thermal treatment prosesses, such as heating, burning and so on in refining non-ferrous metals.

For removing mercury there has further been proposed a method, in which the gases are passed through an aqueous solution containing a substance which absorbs mercury easily, such as thiourea or so on. However, in this method, the pressure loss is considerably large due to the forced passage of gases through the aqueous solution, so that this is problematic in the apparatus.

DETAILED DESCRIPTION OF THE INVENTION

According to the present invention, all the problems in the previous methods mentioned above can be solved. In the following, the invention will be explained in full detail.

A compound of mercury is subject to be converted into metallic form, so that it changes easily into metallic mercury by, for example, slight amount of reducing agent or even by heating. Metallic mercury reveals as considerably high vapour pressure and volatilizes easily. The vapour pressures at various temperatures of mercury are shown as follows:

$10^{-3}$ mmHg at 20° to 30° C.
$10^{-2}$ mmHg at 50° to 60° C.
$10^{-1}$ mmHg at about 100° C.
1 to 2 mmHg at 120° to 130° C.
10 to 20 mmHg at 180° to 190° C. (see Chemical Handbook)

Thus, mercury may often be contained in gases in a form of metal vapour, so that in many cases it cannot be removed by employing a physical treatment such as scrubbing or settling.

We inventors of the present invention have given our attention to the fact, that mercury sulfide has a very small solubility product, and also a very small vapour pressure. We have aimed at a removal of mercury by a mechanism in which mercury is removed by fixing it by a substitution with a metal sulfide having greater solubility product than that of mercury sulfide. The order of formation of sulfide of metals is given, according to so-called Schürmann series, as follows: Pd, Hg, Ag, Cu, Bi, Cd, Sb, Sn, Pb, Zn, Ni, Co, Fe, . . . As can be seen, mercury will form its sulfide more easily than other metals.

As to the solubility products for various metal sulfides, the following data have been available;

| Sulfides | Soly. Prod. | Sulfides | Soly. Prod. |
|---|---|---|---|
| HgS | $10^{-52}$ | $As_2S_3$ | $10^{-29}$ |
| $Hg_2S$ | $10^{-47}$ | $Fe_2S$ | $10^{-18}$ |
| PbS | $10^{-23}$ | NiS | $10^{-19}$ |
| CdS | $10^{-33}$ | ZnS | $10^{-22}$ |
| $Sb_2S_3$ | $10^{-29}$ | | |

The solubility product of mercury sulfide is, as shown above, very small as compared to other metal sulfides, though the values may vary in accordance with the pH of the solution.

Since raw materials for non-ferrous metals exist mainly as sulfides, which may contain some sulfates and chlorides, the refinery exhaust gas thereof is an acidic gas containing $SO_2$ and $SO_3$ besides $CO_2$, $N_2$, $H_2O$, $O_2$, etc. Therefore, when such refinery exhaust gas is dissolved in water, or when it reaches its dew point, an acidic or weakly acidic pH value will be shown.

For the purpose of the present invention, it is permissible to use any metal sulfides when the gas will present a neutral atmosphere, whereas metal sulfide used are restricted when refinery exhaust showed an acidic property. Some sulfide, for example, synthetic zinc sulfide and iron sulfide, may dissolve in such case. However, natural minerals of zincblende and pyrrhotite can be used as a mercury absorbing agent, because these are not dissolved by weak acid.

In the following, reaction equations for mercury and other metal ions with various sulfides are shown.

| | | |
|---|---|---|
| Hg (metal) | $+ PbS + SO_2 + O_2$ | $= HgS + PbSO_4$ |
| 2Hg (metal) | $+ PbS + SO_2 + O_2$ | $= Hg_2S + PbSO_4$ |
| $Hg^{++}$ | $+ PbS$ | $= HgS + Pb^{++}$ |
| $2HG^+$ | $+ PbS$ | $= Hg_2S + Pb^{++}$ |
| Hg (metal) | $+ ZnS + SO_2 + O_2$ | $= HgS + ZnSO_4$ |
| 2Hg (metal) | $+ ZnS + SO_2 + O_2$ | $= Hg_2S + ZnSO_4$ |
| $Hg^{++}$ | $+ ZnS$ | $= HgS + Zn^{++}$ |
| $2Hg^+$ | $+ ZnS$ | $= Hg_2S + Zn^{++}$ |
| $Pb^{++}$ | $+ ZnS$ | $= PbS + Zn^{++}$ |
| $Pb^{++}$ | $+ FeS$ | $= PbS + Fe^{++}$ |
| $Cd^{++}$ | $+ ZnS$ | $= CdS + Zn^{++}$ |
| $2As^{+++}$ | $+ 3ZnS$ | $= As_2S_3 + 3Zn^{++}$ |

Similar reactions are performed with other sulfides.

From these considerations, it is recognizable that mercury existing in gases can be removed in such a manner that mercury, which reveals high vapour pressure, is converted into mercury sulfides, which show very low vapour pressure.

Even mercury compounds existing in gases without sulfur dioxide can be removed by fixing them by converting into mercury sulfide under the substitution reaction in accordance with the equations above. Such will also apply for various other metal sulfides: they can be removed by substitution independent of the existence of sulfur dioxide. In the case of mercury vapour, it undergoes also a strong adsorption reaction together with the substitution reaction. Thus mercury vapour in the air containing no sulfur dioxide can be removed by using lead sulfide or simple sulfur substance to adsorb it.

As to the preparation of the active substance to be used as absorbent according to the present invention, two ways may be considered. On the one hand, the sulfide or simple sulfur substance is bound onto a carrier substance and, on the other hand, a carrier is impregnated with a soluble salt of a metal and then hydrogen sulfide gas or an aqueous solution of sodium sulfide is passed therethrough to deposit the metal sulfide onto the carrier substance.

As carrier substance, inorganic or organic porous substances can advantageously be utilized. Those which are light and easily granulated into homogeneous particle size with having porous surface, such as pumice, are preferred, Pumice is one of porous volcanic ejecta and upon which the deposition of the absorbing agent is easy and the deposited substance is difficultly removed off by shocks.

Among organic substances, sponge, spongy rubber, polyurethane foam and so on may be used.

When the temperature of the exhaust gas is higher, or when the corroding tendency of the exhaust gas is greater, an inorganic silicic porous substance, such as zelite or pumice is suitable for the carrier. When the temperature of the exhaust gas is low and its corrosive tendency is small, other inorganic and organic substance may be used for the carrier.

The smaller the particle size of the carrier is, the greater is the surface area thereof, so that the contact surface area becomes large and thereby the taking up of mercury is facilitated. Thereby however, the pressure loss may become uneconomically large, so that a particle size of from several milimeter to several centimeter may be desirable.

In preparation of the absorbent, synthetic sulfides are prepared by blowing hydrogen sulfide gas into an aqueous solution of various salts of metals. For example, lead sulfide and zinc sulfide can be prepared by blowing hydrogen sulfide gas into aqueous solution of, for instance, lead acetate or zinc sulfate and filtrating off the thereby formed precipitate of sulfide, which is further processed into the absorbent. The absorbent to be used according to the present invention can also be prepared from natural sulfide minerals, such as galena, zincblende, pyrite, pyrrhotite and chalcopyrite, etc., by washing them sufficiently with water and subsequently further subjecting to a surface treatment with dilute sulfuric acid or by washing them with dilute sulfuric acid and thereafter further subjecting to a sulfurizing with hydrogen sulfide.

The surfaces of various sulfide ores from mine are covered in general with dressing agent and slimes and, in many cases, are covered with salts, such as sulfate, due to oxidation by air. Thus, these ores as such are ineffective in using for scavenging mercury in gases, because the surface thereof does exist not as the mineral itself, such as galena or zincblende, but it exists, for instance, in sulfatized state.

Therefore, it may be necessary to subject the surface of the ore to an activation treatment such as sulfurizing with hydrogen sulfide, in order to provide the absorbent according to the present invention.

In using sulfur simple substance for the absorbing agent, a very finely pulverized sulfur which is produced by grinding, or simple sulfur substance formed by the reaction of sulfur dioxide with hydrogen sulfide (so-called Claus-reaction), may be adequate.

According to the present invention, a synthesized sulfide, a natural sulfide mineral subjected to a pretreatment of surface cleaning or a finely pulverized sulfur simple substance is used for the absorbing agent and a porous material, for example, pumice, is employed for the carrier.

According to the present invention, an exhaust gas containing mercury or metal compound is passed through an absorption column, in which the absorbent made by combining the absorbing agent with the carrier is packed, to contact the gas with the absorbing bed and thereby to fix the mercury or metal compound either by converting it into sulfide or by adsorbing it.

The carrier may be combined with one sort of absorbing agent or with two or more kinds of absorbing agent in mixture.

The method of removing metal contamination in gases according to the present invention has many advantages in that, the absorption apparatus is simple, because it is possible to remove mercury or other metal compounds in gas by merely contacting the gas with the absorbent packed in an absorption column, and moreover in that, the pressure loss in the conduction of the gas is small and further in that, the absorbent is stable enough to permit an easy operation even for acidic gases such as factory exhaust gas and non-ferrous metal refining exhaust gas.

In the following, the invention is further explained by Examples.

EXAMPLE 1

500 gms. of pumice (size 3–6 mm) are soaked in 1 l of aqueous solution of lead acetate and taken out to dry. After drying, it is packed in a column and is then sulfurized by passing hydrogen sulfide through it. The lead content in the so treated pumice was 7%. Using the thus prepared absorbent, efficiency of removal of mercury in gas, was investigated in such a manner that the absorbent is packed in a column having a sectional area of $5 \times 5$ cm and 20 cm height and gas mixtures containing various amounts of mercury are passed therethrough. The gas mixture used for the experiments was consisted of 95% of air and 5% of sulfur dioxide, based on the volume, in which mercury was admixed in various concentrations. The rate of gas flow through the column was 16 l/min.

The results are summarized below, wherein the concentrations of mercury are given in $mg/m^3$.

| concentration of mercury $(mg/m^3)$ | | ratio of removal of mercury (%) |
|---|---|---|
| original | after treatment | |
| 0.42 | 0.005 | 98.7 |
| 1.37 | 0.012 | 99.1 |
| 1.98 | 0.031 | 98.4 |

-continued

| concentration of mercury (mg/m³) | | ratio of removal of mercury (%) |
|---|---|---|
| original | after treatment | |
| 2.39 | 0.019 | 99.8 |
| 2.61 | 0.025 | 99.6 |
| 3.88 | 0.040 | 99.0 |

EXAMPLE 2

An absorbent was prepared by blowing hydrogen sulfide gas into an aqueous solution of lead acetate to form lead sulfide, washing the so obtained precipitate with water, filtering it off and binding it onto granulated pumice. The lead content of the so prepared absorbent was 9.5% by weight. The experiment was carried out using gas of 100% air at a flow rate of 16 l/min. and specific velocity of 2000.

Results obtained are summarized as follows:

| concentration of mercury (mg/m³) | | ratio of removal of mercury (%) |
|---|---|---|
| original | after treatment | |
| 7.19 | 0.012 | 99.8 |
| 7.38 | 0.017 | 99.8 |
| 7.44 | 0.023 | 99.7 |
| 9.66 | 0.095 | 99.0 |
| 3.65 | 0.013 | 99.6 |
| 5.48 | 0.021 | 99.6 |

EXAMPLE 3

An experiment was carried out using an absorbent which was prepared by binding sulfur produced by Claus reaction from hydrogen sulfide and sulfur dioxide onto a granulated pumice, in order to investigate and mercury removal efficiency thereof. The sulfur content of the so prepared absorbent was 2.5%. The experimental conditions were: gas used: air 95%+sulfur dioxide 5%; gas flow rate: 5 l/min.; S.V.: 600

Results obtained were:

| concentration of mercury (mg/m³) | | ratio of removal of mercury (%) |
|---|---|---|
| original | after treatment | |
| 8.76 | 0.85 | 90.3 |
| 8.30 | 0.21 | 90.2 |
| 10.94 | 0.61 | 94.5 |
| 10.23 | 0.49 | 95.2 |
| 6.38 | 0.43 | 93.3 |
| 5.84 | 0.41 | 93.0 |

EXAMPLE 4

A column of 4×4 cm and 60 cm height was filled with absorbent prepared from pumice (size about 10 mm) and synthetic lead sulfide. The height of packing (bed depth) was 16 cm. Mercury removal ratio was examined by passing a mercury-containing gas through the column.

Experimental conditions were: gas used:95% air+5% sulfur dioxide; gas flow rate: 5.25l/min.; S.V.: 1230

| mercury conc. (mg/m³) | | volume of gas treated (m³) | ratio of removal of mercury (%) |
|---|---|---|---|
| original | after treat. | | |
| 3.30 | 0.056 | 4.41 | 98.3 |
| 2.37 | 0.017 | 8.19 | 99.3 |
| 4.68 | 0.017 | 13.23 | 99.6 |
| 2.38 | 0.021 | 17.01 | 99.1 |
| 1.41 | 0.016 | 22.68 | 98.9 |
| 1.61 | 0.014 | 31.50 | 99.1 |

EXAMPLE 5

Efficiency of mercury removal was examined under the same conditions as in Example 4, except that an absorbent prepared by binding pretreated zincblende onto pumice (size: about 10 mm) was used.

| mercury conc. (mg/m³) | | volume of gas treated (m³) | ratio of removal of mercury (%) |
|---|---|---|---|
| original | after treat. | | |
| 3.15 | 0.043 | 5.67 | 98.6 |
| 1.68 | 0.033 | 8.19 | 98.0 |
| 5.05 | 0.034 | 13.54 | 99.3 |
| 5.69 | 0.030 | 17.64 | 99.5 |
| 3.31 | 0.005 | 22.68 | 99.8 |
| 4.52 | 0.021 | 27.09 | 99.5 |

EXAMPLE 6

Efficiency of mercury removal was examined under the same conditions as in Example 4, except that an absorbent prepared by binding pretreated galena onto pumice (size: about 10 mm) was used.

| mercury conc. (mg/m³) | | volume of gas treated (m³) | ratio of removal of mercury (%) |
|---|---|---|---|
| original | after treat. | | |
| 1.28 | 0.022 | 8.19 | 98.3 |
| 5.23 | 0.047 | 11.97 | 99.1 |
| 5.05 | 0.057 | 16.07 | 98.07 |
| 4.27 | 0.027 | 22.68 | 99.4 |
| 4.34 | 0.023 | 26.46 | 99.5 |
| 4.52 | 0.046 | 31.50 | 99.0 |

EXAMPLE 7

Efficiency of mercury removal was examined under the same conditions as in Example 4, except that an absorbent prepared by binding pretreated galena and synthetic lead sulfide in weight ratio of 9:1 onto pumice (about 100 mm) was used.

| mercury conc. (mg/m³) | | volume of gas treated (m³) | ratio of removal of mercury (%) |
|---|---|---|---|
| original | after treat. | | |
| 5.05 | 0.005 | 4.73 | 99.9 |
| 3.16 | 0.003 | 6.62 | 99.9 |
| 5.69 | 0.002 | 9.45 | 99.9 |
| 5.42 | 0.001 | 17.64 | 99.9 |
| 4.38 | 0.003 | 27.09 | 99.9 |
| 3.26 | 0.002 | 32.05 | 99.9 |

In all the Examples above, mercury was added as vapour formed by heating liquid mercury metal.

What is claimed is:

1. A method for the removal of mercury-containing contaminants in an acidic gas containing $SO_2$ and $SO_3$ by passing the gas through a filter bed, characterized in that the filter bed is an absorbent consisting essentially of a carrier and an absorbing agent selected from the group consisting of synthetic lead sulfide and natural lead sulfide minerals.

2. A method according to claim 1 characterized in that the carrier comprises an inorganic porous pumice.

3. A method according to claim 1 characterized in that the absorbent is prepared by binding the absorbing agent onto the carrier.

4. A method of claim 1 wherein the absorbing agent consists of a neutral lead sulfide mineral which has been washed with water and subsequently surface-treated with dilute sulfuric acid and with hydrogen sulfide.

5. A method for removing mercury-containing contaminants in an acidic gas containing $SO_2$ and $SO_3$ which comprises flowing the gas containing the said contaminants through an absorption column packed with an inorganic porous pumice having lead sulfide bound to the surface thereof, and thereby substituting mercury sulfide for said lead sulfide and thus removing mercury-containing contaminants from the gas.

* * * * *